(12) United States Patent
Schweickert et al.

(10) Patent No.: US 6,493,406 B1
(45) Date of Patent: Dec. 10, 2002

(54) METHOD AND APPARATUS FOR SYMBOL INDEPENDENT DISCRIMINATOR CORRELATOR AUTOMATIC FREQUENCY CONTROL

(76) Inventors: Robert K. Schweickert, 4033 SE. Hammock Pl., Jupiter, FL (US) 33478; John Richard Oakley, 702 Ivy Ct., Round Rock, TX (US) 78681

( * ) Notice: Subject to any disclaimer, the term of this patent is extended or adjusted under 35 U.S.C. 154(b) by 0 days.

(21) Appl. No.: 09/359,553

(22) Filed: Jul. 22, 1999

(51) Int. Cl.[7] .............................................. H04L 27/06
(52) U.S. Cl. ..................... 375/344; 375/326; 455/182.2; 455/192.2
(58) Field of Search ................................. 375/344, 343, 375/326, 327, 375; 455/136, 139, 164.1, 164.2, 173.1, 180.3, 182.2, 192.2

(56) References Cited

U.S. PATENT DOCUMENTS 6,130,920 A * 10/2000 Powell, II et al. .......... 375/343
6,163,567 A * 12/2000 Hatch .......................... 375/149
6,304,620 B1 * 10/2001 Rouphael ..................... 375/344
6,311,129 B1 * 10/2001 Lin .............................. 701/214

* cited by examiner

*Primary Examiner*—Mohammad H. Ghayour
(74) *Attorney, Agent, or Firm*—Randi L. Dulaney

(57) ABSTRACT

A symbol independent automatic frequency controller (100) includes a symbol correlator (110) for receiving a complex digital signal generated within a selective call receiver wherein the symbol correlator provides a real signal (114), an imaginary signal (116), and a magnitude signal (112), a discriminator (140) coupled to the symbol correlator for receiving and processing the real signal and the imaginary signal to provide a frequency error signal, a low pass filter (120) and comparison element (130) for filtering the magnitude signal and comparing the magnitude signal to a predetermined lock threshold signal that controls the bandwidth of the symbol correlator in the event the magnitude signal exceeds the lock threshold signal, and a feedback loop providing the imaginary signal (116) to an accumulator (170) and back to the symbol correlator wherein the accumulator provides the symbol correlator with an apriorisymbol phase feedback (172).

8 Claims, 4 Drawing Sheets

METHOD AND APPARATUS FOR SYMBOL INDEPENDENT DISCRIMINATOR CORRELATOR AUTOMATIC FREQUENCY CONTROL

FIELD OF THE INVENTION

The present invention is directed to a method and apparatus in a communication device, such as a selective call receiver, and more particularly to a communication device capable of eliminating a symbol phase and frequency difference between transmitted symbols and apriori symbols generated within a correlator.

BACKGROUND OF THE INVENTION

The Maximum Likelihood Detector which is also known as the Optimum Noncoherent Detector (or correlation detector) for detecting frequency shifted keyed (FSK) signals in an additive white gaussian noise channel is well known. The performance of a correlation detector can also be achieved with other detector architectures such as a Matched Filter or a Fast Fourier Transform (FFT). However, the ability of these detectors to achieve a significant sensitivity improvement (i.e., 4 dB) over that of discriminators for M-level orthogonal signaling (i.e. FLEX®) or up to 3 dB improvement for 4-level quasi-orthogonal signaling (i.e., ReFLEX®) depends greatly on the frequency offset between the transmitter and receiver. For example, acceptable performance of the correlation detector (in a FLEX receiver) requires the transmitter's carrier frequency and receiver's local oscillator frequency to match better than about 0.2 parts per million (ppm) at 900 MegaHertz. Stable frequency references accurate to this level of precision are not available at a reasonable cost. At least 5 to 10 ppm of residual frequency offset error is typical in today's radios. Thus, what is needed is a correlation detector having an automatic frequency control (AFC) system capable of providing acceptable performance in terms of eliminating frequency offset error at very low cost.

DESCRIPTION OF A PREFERRED EMBODIMENT

Figure 1:
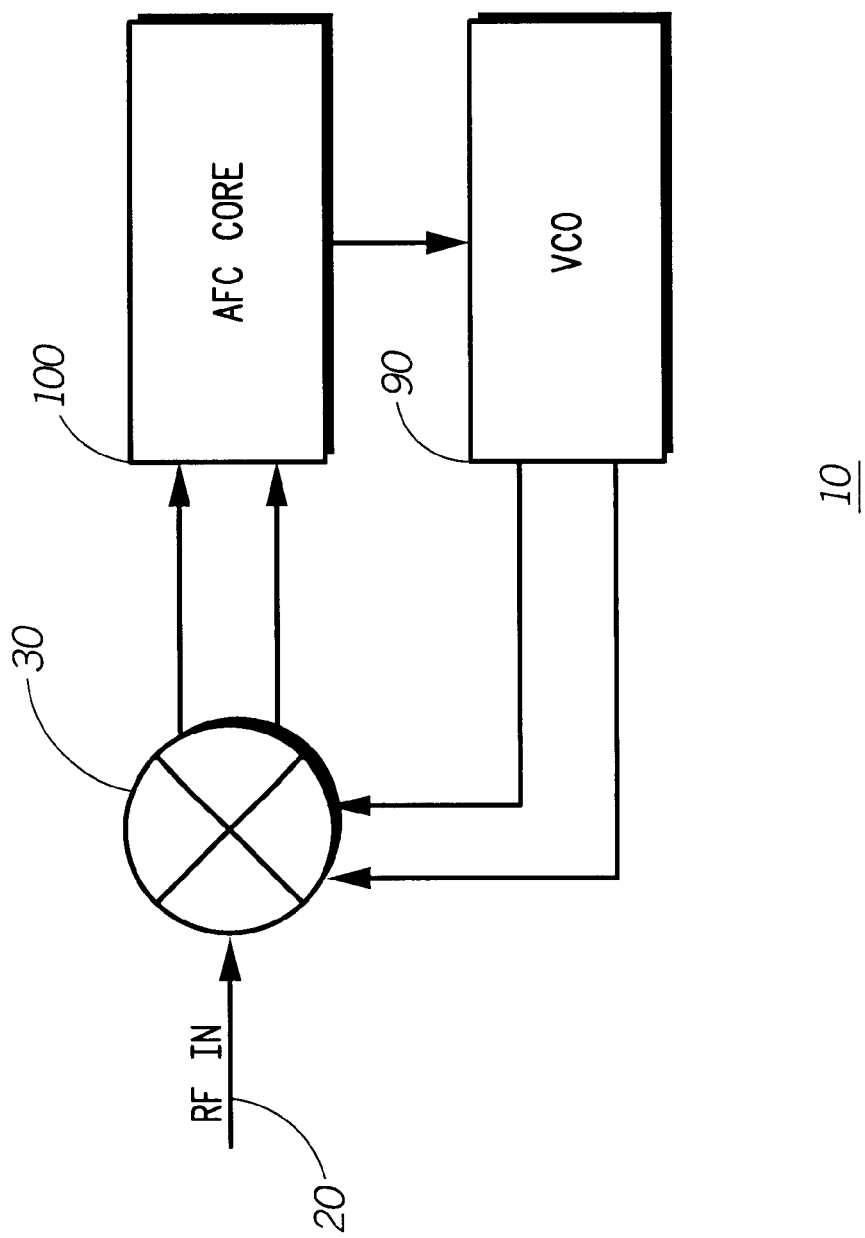
FIG. 1 is a block diagram of an AFC mixed-signal feedback loop in accordance with the present invention.

FIG. 1 illustrates a basic AFC mixed-signal feedback loop 10 in accordance with the present invention showing a mixer 30 mixing a radio frequency signal 20 with a reference frequency signal provided by a voltage controlled oscillator (VCO) 90. The mixer 30 provides a received signal to an Automatic Frequency Controlled element 100 or AFC core which provides an output to control the VCO 90. The VCO 90 in turn feeds back the reference frequency to the mixer. As will be shown in FIG. 3, the AFC element 100 uses a symbol correlator and discriminator to provide a method, independent of transmitted symbol, of eliminating frequency offset in a selective call receiver between a frequency transmitted to the selective call receiver and a reference frequency at the selective call receiver. In summary, this method preferably includes the basic steps of receiving the radio frequency signal 20 into the mixer 30 which in turn provides a received signal to the AFC element 100. The output of the AFC element 100 controls a VCO 90 wherein the VCO 90 in turn feeds back a reference frequency to the mixer 30.

The AFC element 100 uses a novel symbol-correlator architecture utilizing apriori-symbol phase-feedback to analyze the mixer 30 output. The resulting output of this correlator subsystem, consists mainly of a single frequency component representative of instantaneous frequency offset, independent of transmitted FSK symbol, and with substantially improved signal to noise ratio. The apriori-symbol phase-feedback eliminates the average symbol to symbol phase changes which would otherwise occur in the complex correlator output. As the AFC loop settles, the apriori-symbol phase-feedback provides for a smoother and more continuous complex output from the correlator as the transmitted symbols change. The control signal output from this correlator is then further analyzed within AFC element 100 by a discriminator and finally then averaged by an accumulator. The output from this accumulator controls the frequency of the FracN Synthesizer (or VCO) and eliminates the frequency offset in a selective call receiver between a frequency transmitted to the selective call receiver and a reference frequency at the selective call receiver. The apriori-symbols within AFC element 100 serve as the reference frequency within the receiver.

Figure 2:
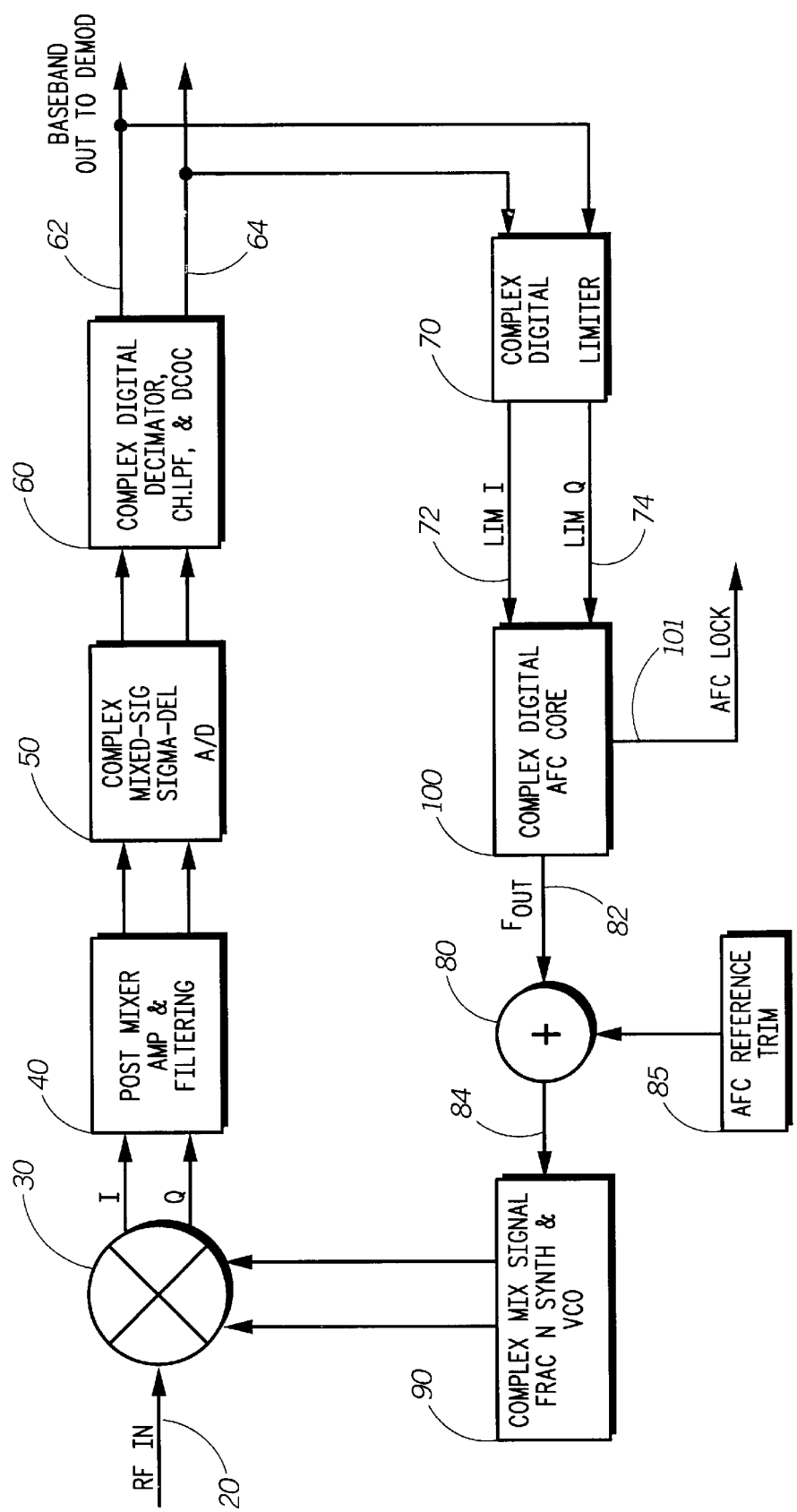
FIG. 2 is a more detailed block diagram of an AFC mixed-signal feedback loop using complex signals in accordance with the present invention.

Referring to FIG. 2, a more detailed block diagram of an AFC mixed-signal feedback loop 10 using complex signals in accordance with the present invention is shown. As in FIG. 1, a radio frequency signal 20 is mixed at a mixer 30 with a local oscillator signal or reference signal. The reference signal is preferably generated by a fractional N synthesizer and/or VCO 90. Additionally, the reference signal should be a complex signal having in-phase and quadrature portions. Likewise, the mixer output provides a complex signal analog input to a post mixer amplifier and filtering element 40 for amplifying and filtering. The element 40 provides a complex analog input signal to a sigma-delta analog to digital converter element 50. The element 50 converts an analog signal and provides a complex digital signal to another element 60 that performs the functions of decimating, channel low pass filtering and direct current offset correction. The output of element 60 provides a baseband output (in-phase output portion 62 and quadrature output portion 64) to a demodulator (not shown). This same output is still a complex digital signal which serves as an input signal to a limiter element 70. The output of element 60 may actually be multiple parallel outputs, but the limiter element 70 provides a single output for each of the in-phase and quadrature portions of the complex signal designated as the LIM 1 (72) and LIM Q (74) signals respectively. Signals 72 and 74 provide a complex input signal to the AFC element 100. The output of the AFC element 100 provides a control input 82 to the fractional N synthesizer and/or VCO element 90. The reference trim register 85 can be utilized during manufacture or servicing to trim out a large crystal oscillator to within acceptable tolerance levels. This allows for a less expensive crystal to be used. The AFC reference trim register 85 can be added to the control input 82 using a summing element 80 to provide an adjusted control input 84 to the element 90. The register 85 value simply offsets FOUT by a fixed value, and has no affect on the dynamic behaviour of the Discriminator Correlator AFC loop over its frequency 'pull-in' range.

Figure 3:
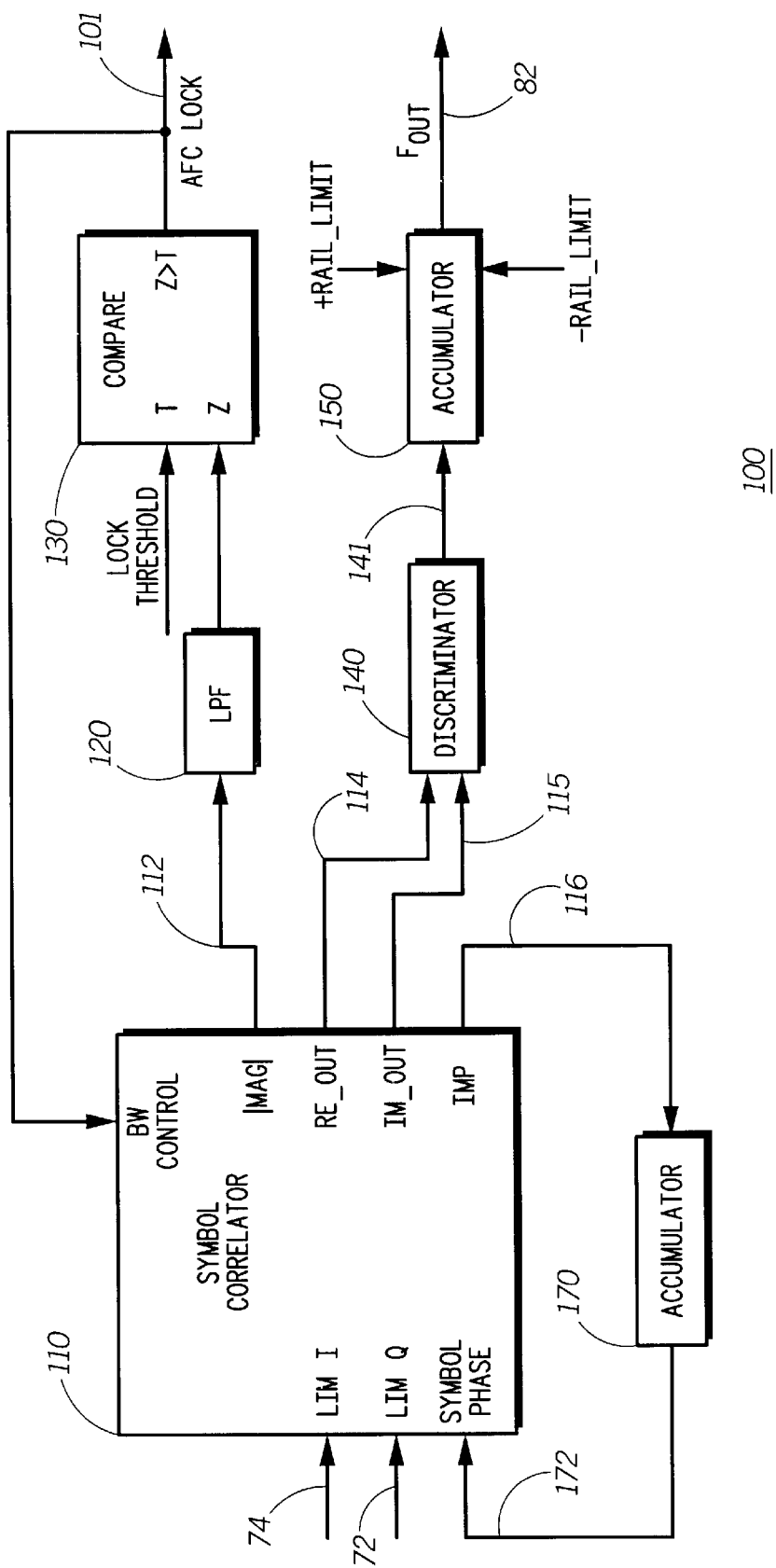
FIG. 3 is a block diagram of an AFC circuit in accordance with the present invention.

The AFC element 100 also provides an AFC Lock signal 101 which is fed back to a symbol correlator within AFC element 100 for bandwidth control as shown in FIG. 3.

FIG. 3 is a block diagram showing the AFC element 100 in greater detail. The AFC element serves as a symbol independent automatic frequency controller having a symbol correlator 110 for receiving a complex digital signal (signals 72 and 74) generated within a selective call receiver wherein the symbol correlator 110 provides a real output signal 114, an imaginary output signal 115, an imaginary signal 116 and a magnitude signal 112. A discriminator 140 is preferably coupled to the symbol correlator 110 for receiving and processing the real signal 114 and the imaginary signal 115 to provide a frequency offset error signal 141. The frequency offset error signal 141 is accumulated in an accumulator 150 and further processes the output of the discriminator 140. The accumulated signal maybe limited by upper and lower thresholds (upper and lower rail limits) to set a maximum frequency offset range of which the AFC element 100 will control. The output from the accumulator 150 provides the control input 82 to the Fraction N synthesizer and/or VCO 90 (see FIG. 2).

A low pass filter 120 filters the magnitude signal and a comparison element 130 compares the magnitude signal to a predetermined lock threshold value that controls the bandwidth of the symbol correlator 110 in the event the magnitude signal exceeds the lock threshold value. This circuitry serves to narrow the AFC element's symbol-correlator bandwidth when the residual frequency-offset is sufficiently small. The resultant narrow correlator bandwidth further improves the signal to noise ratio of the control signal fed to the discriminator, and therefore allows for finer control of residual frequency offset error.

The AFC element 100 further comprises a feedback loop providing the imaginary signal 116 to an accumulator 170 and back to the symbol correlator 110 wherein the accumulator 170 provides the symbol correlator with an apriori-symbol phase feedback 172. The imaginary signal 116 is preferably an apriori symbol phase error signal. Preferably, the imaginary signal 116 is accumulated, scaled and negatively fedback to correct the apriori-symbols' phase to assist in nulling out the average intersymbol phase discontinuities that may exist. The AFC element in this manner also operates to rapidly eliminate frequency offset on strong or weak signals at sensitivity levels independent of a transmitted set of data.

Figure 4:
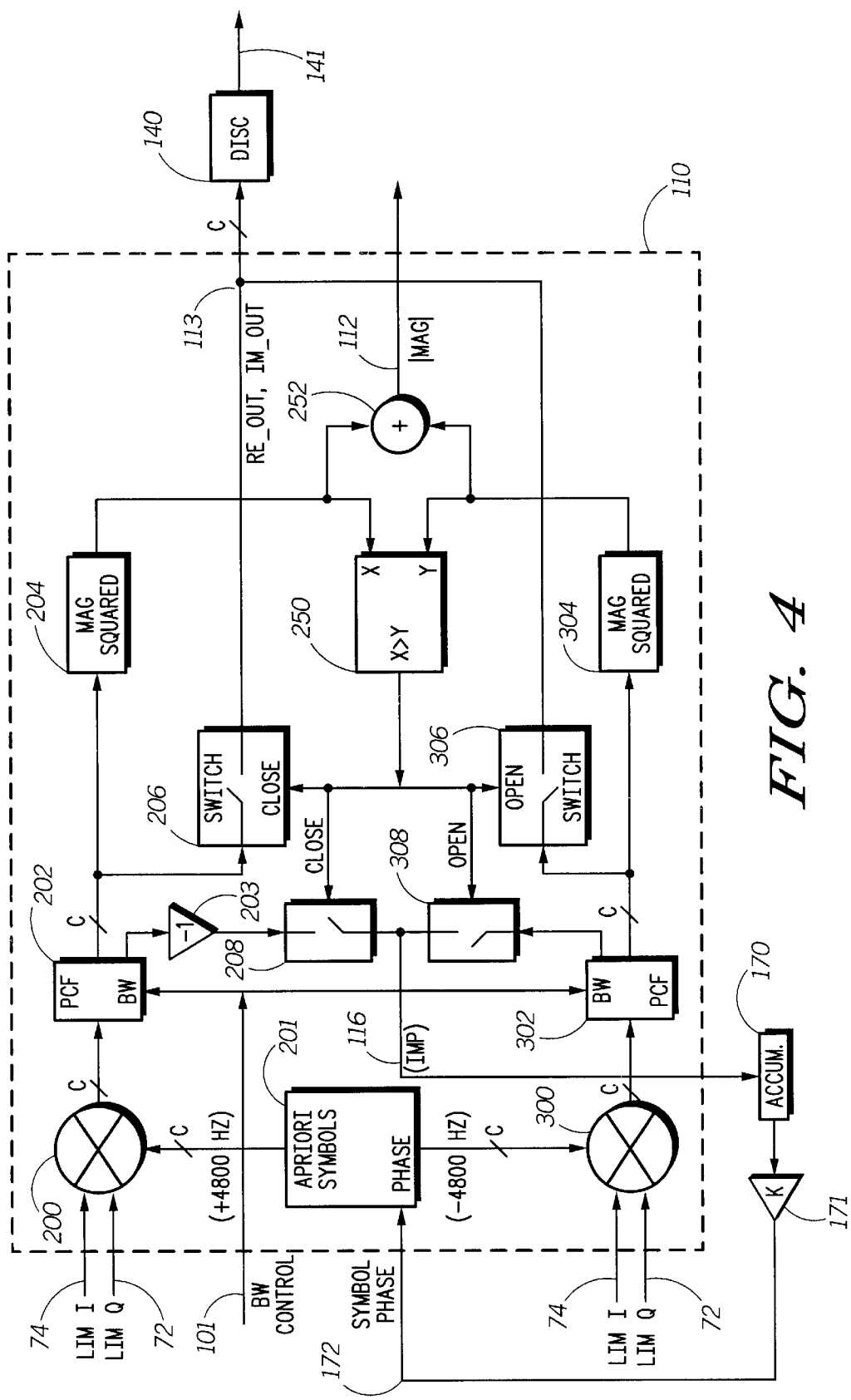
FIG. 4 is a block diagram of a symbol correlator used in the AFC circuit in accordance with the present invention.

Referring to FIG. 4, a block diagram is shown of the symbol correlator 110 used in the AFC element 100 in accordance with the present invention. The limited complex rectangular input signal (Lim I+j*Lim Q (74,72)) is preferably multiplied by complex +/−4800 Hz apriori signals (201) in complex multipliers 200 and 300. Preferably, dual-bandwidth rectangular window filters 202 and 302 filter the outputs from the complex multipliers 200 and 300 respectively. These window filters working as low-pass filters exhibit a sin(x)/x magnitude response. In a wide-band mode, filters 202 and 302 preferably have a 5-sample rectangular impulse response resulting in a sin(x)/x magnitude response with a corresponding first null at 9600 Hz (the sampling rate is 48 kHz). In a narrow-band mode, filters 202 and 302 preferably have a 15-sample rectangular impulse response resulting in a sin(x)/x magnitude response with corresponding first null at 3200 Hz (again, the sampling rate is 48 kHz).

The wide-band mode for filters 202 and 302 is selected during initial frequency acquisition to ideally meet a +/−5 kHz frequency 'pull-in' range. The AFC_LOCK signal 101 (see FIGS. 3 and 4) preferably becomes active when the residual frequency offset is less than about 2 kHz and dynamically selects the narrow-band mode for filters 202 and 302. This results in a significant improvement in signal to noise ratio, allowing for accurate fine-frequency offset acquisition on noisy signals.

The Imaginary (IM) output components from filters 202 and 302 are multiplexed through switches 208 and 308 respectively. The signal with the greatest energy is selected at a node that provides imaginary signal 116. The imaginary signal 116 is accumulated (170), scaled (171) and negatively fed back to correct the apriori-symbols' phase (201) as signal 172. The apriori-symbol phase-feedback 172 thus nulls average intersymbol phase discontinuities. The resulting: complex signal RE_OUT, IM_OUT (signal 113) is primarily a continuous-phase single-frequency complex tone of frequency equal to the instantaneous frequency offset, independent of received symbol.

This complex rectangular correlator signal 113, (RE_OUT+j*IM_OUT) is then operated on by the discriminator 140. The discriminator 140 is a complex discriminator whose output signal 141 corresponds to a value proportional to instantaneous frequency of its complex input. Mathematically, the discriminator 140 operation is equivalent to: OUT141=RE_OUT*D(IM_OUT)IM_OUT*D(RE_OUT), where the operator 'D(IM_OUT)' corresponds to the time-derivative of IM_OUT and the operator 'D(RE_OUT)' corresponds to the time-derivative of RE_OUT.

The output signal 141 from the discriminator is accumulated in accumulator 150 to produce the frequency control signal $F_{OUT}$ (82), as depicted in FIG. 3. $F_{OUT}$ (82) dynamically controls the FRAC N SYNTH & VCO block 90 as depicted in FIG. 2. The Discriminator Correlator AFC loop (FIG. 2), utilizes the properties of negative feedback to adaptively null the frequency offset at the complex baseband Output (nodes or signals 62 and 64).

Note, in FIG. 4, the letter "C" designates a complex signal. Note that the magnitude signal 112 is provided conventionally by summing (252) the squares of the magnitudes (204 or 304) of the complex signals from the post correlator filters 202 and 302 respectively. Note also that the appropriate branches for signals 113 and 116 with the greatest magnitude are selected by the comparison logic element 250 via switches 206 or 306 for signal 113 or via switches 208 or 308 for signal 116.

In another aspect of the present invention, a method is shown in FIG. 4 of determining a carrier frequency offset in a correlator independent of data modulating a carrier frequency. The method comprises the steps of creating a local apriori-symbol phase signal from an imaginary portion of a received complex signal within the correlator and eliminating an average symbol to symbol phase difference between the received complex signal and the local apriori-symbol phase signal. Then a series of individual complex correlator components are summed to provide a single tone output representative of the carrier frequency offset. The method may further comprise the step of providing a control signal output to a fractional N synthesizer wherein the control signal output is a feedback control signal developed by accumulating a discriminated correlator signal.

The above description is intended by way of example only and is not intended to limit the present invention in any way except as set forth in the following claims.

What is claimed is:

1. A symbol independent automatic frequency controller, comprising:

a symbol correlator for receiving a complex digital signal generated within a selective call receiver wherein the symbol correlator provides a real signal, an imaginary signal, and a magnitude signal;

a discriminator coupled to the symbol correlator for receiving and processing the real signal and the imaginary signal to provide a frequency offset error signal;

an accumulator to further process an output of the discriminator;

a low pass filter and comparison element for filtering the magnitude signal and comparing the magnitude signal to a predetermined lock threshold signal that controls the bandwidth of the symbol correlator in the event the magnitude signal exceeds the lock threshold signal; and a negative feedback loop providing an apriori symbol phase error signal to an accumulator and back to the symbol correlator to null the apriori symbol phase error signal.

2. The symbol independent automatic frequency controller of claim 1, wherein the automatic frequency controller further comprises a negative feedback loop providing the frequency offset error signal to another accumulator and back to a voltage controlled oscillator to null the frequency offset error signal.

3. The symbol independent automatic frequency controller of claim 1, wherein the controller further comprises a negative feedback loop providing the frequency offset error signal to an accumulator and back to a synthesizer to null the frequency offset error signal.

4. The symbol independent automatic frequency controller of claim 1, wherein the controller rapidly eliminates frequency offset on strong or weak signals at sensitivity levels independent of a transmitted set of data.

5. The symbol independent automatic frequency controller of claim 1, wherein the controller further comprises a second accumulator for receiving the frequency error signal from the discriminator.

6. The symbol independent automatic frequency controller of claim 1, wherein the second accumulator provides a frequency adjustment signal to a fractional N synthesizer.

7. A symbol independent automatic frequency controller, comprising:

a symbol correlator for receiving a complex digital signal generated within a selective call receiver wherein the symbol correlator provides a real signal, imaginary signals, and a magnitude signal;

a discriminator coupled to the symbol correlator for receiving and processing the real signal and at least one of the imaginary signals to provide a frequency error signal;

a low pass filter and comparison element for filtering the magnitude signal and comparing the magnitude signal to a predetermined lock threshold signal that controls the bandwidth of the symbol correlator in the event the magnitude signal exceeds the lock threshold signal; and a feedback loop providing at least another one of the imaginary signals to an accumulator and back to the symbol correlator wherein the accumulator provides the symbol correlator with an apriori-symbol phase feedback.

8. The symbol independent automatic frequency controller of claim 7, wherein the imaginary signal provided to the accumulator provides an apriori-symbol phase-feedback which assists in nulling out an average intersymbol phase error.

* * * * *

UNITED STATES PATENT AND TRADEMARK OFFICE
CERTIFICATE OF CORRECTION

PATENT NO. : 6,493,406 B1 Page 1 of 1
APPLICATION NO. : 09/359553
DATED : December 10, 2002
INVENTOR(S) : Robert K. Schweickert et al.

It is certified that error appears in the above-identified patent and that said Letters Patent is hereby corrected as shown below:

On the title page item (73) insert -- Assignee: Motorola, Inc., Schaumburg, IL (US) --.

Signed and Sealed this

Thirtieth Day of January, 2007

JON W. DUDAS
*Director of the United States Patent and Trademark Office*